United States Patent [19]

Gellert

[11] Patent Number: 5,094,603
[45] Date of Patent: Mar. 10, 1992

[54] THERMAL VALVE GATED INJECTION MOLDING APPARATUS WITH MELT DISTRIBUTION PLATE

[76] Inventor: Jobst U. Gellert, 7A Prince Street, Georgetown, Ontario, Canada, L7G 2X1

[21] Appl. No.: 671,207

[22] Filed: Mar. 18, 1991

[30] Foreign Application Priority Data

Dec. 17, 1990 [CA] Canada ................ 2032294

[51] Int. Cl.⁵ ............................................ B29C 45/22
[52] U.S. Cl. .................. 425/130; 264/328.8; 264/328.15; 425/549; 425/567; 425/568; 425/570; 425/572; 425/573; 425/588
[58] Field of Search ............... 425/130, 549, 567, 568, 425/569, 570, 572, 573, 588, 564; 264/328.8, 328.13, 328.15

[56] References Cited

U.S. PATENT DOCUMENTS

| | | | |
|---|---|---|---|
| 3,894,823 | 7/1975 | Hanning | 425/130 |
| 4,373,886 | 2/1983 | Hehl | 425/130 |
| 4,657,496 | 4/1987 | Ozeki et al. | 425/130 |
| 4,688,622 | 8/1987 | Gellert | 164/61 |
| 4,717,324 | 1/1988 | Schad et al. | 425/130 |

Primary Examiner—Tim Heitbrink
Attorney, Agent, or Firm—Dalesman & Company

[57] ABSTRACT

Multi-cavity injection molding apparatus to coinject pressurized melt from two or more melt sources. An inner melt passage extends through the central bore of a melt distribution plate and an adjacent heated nozzle. The nozzle has a tapered nose portion which extends into an adjacent heated cavity forming insert having a gate leading to one of the cavities. An outer melt passage is separated by curved conduits on opposite faces of the melt distribution plate into four channels which are radially spaced around the central bore of the nozzle. The four channels lead to a melt funnel duct which extends in the adjacent cavity forming insert around the nose portion of the nozzle. Thus the melt from the outer melt passage is evenly distributed around the melt from the inner melt passage when they join just before entering the gate.

4 Claims, 5 Drawing Sheets

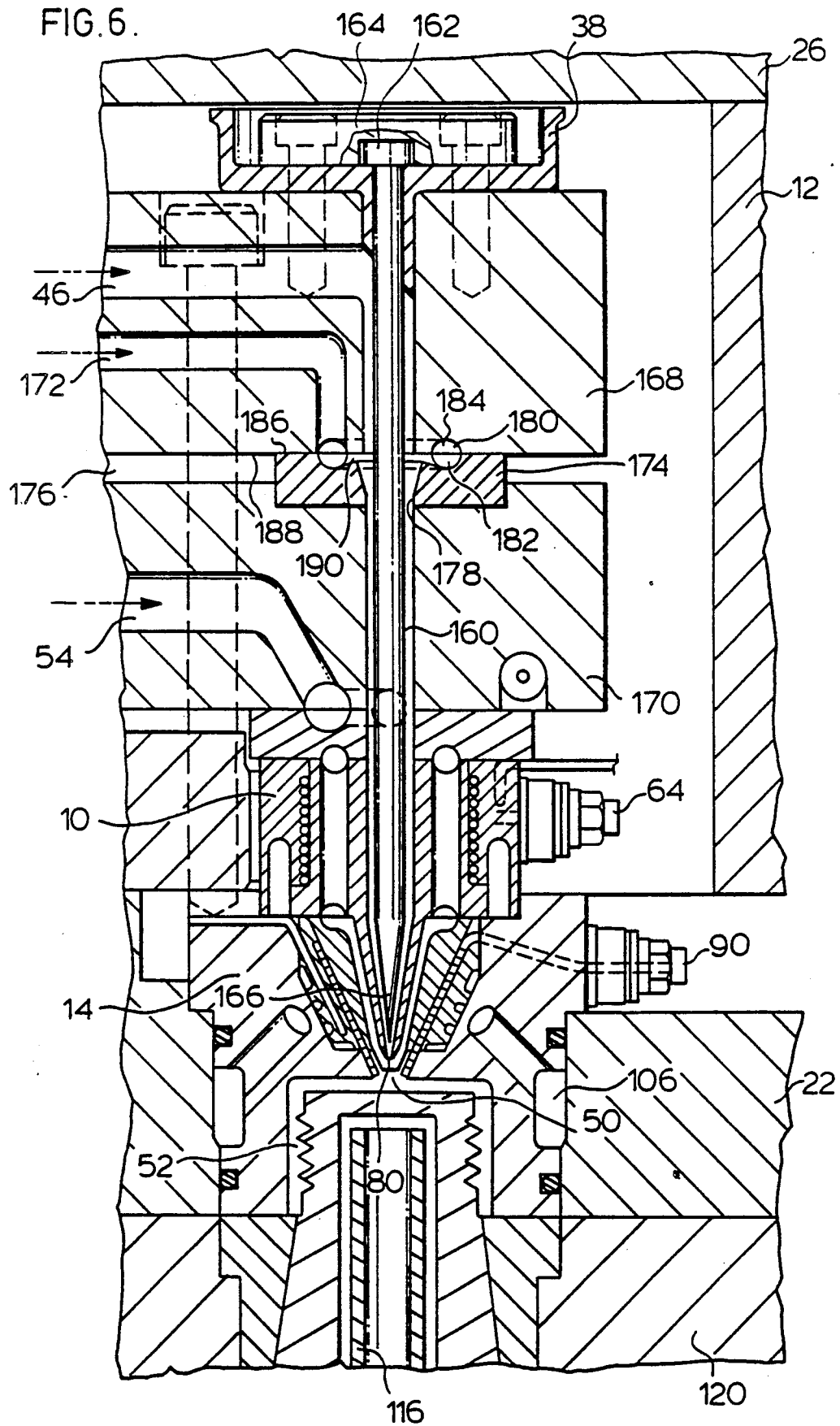

THERMAL VALVE GATED INJECTION MOLDING APPARATUS WITH MELT DISTRIBUTION PLATE

BACKGROUND OF THE INVENTION

This invention relates generally to injection molding and more particularly to multi-cavity thermal gated injection molding apparatus to coinject melt from two or more melt sources having a melt distribution plate mounted between the common manifold and the nozzle leading to each gate.

Coinjection of more than one type of melt is known in the art, as shown in U.S. Pat. Nos. 3,894,823 to Hanning which issued July 15, 1975, 4,373,886 to Hehl which issued Feb. 25, 1983, 4,657,496 to Ozeki et al. which issued Apr. 14, 1987 and 4,717,324 to Schad et al. Which issued Jan. 5, 1988. Thermal gated apparatus having heating and cooling in a cavity forming insert separate from the nozzle as shown in the applicant's Canadian patent application serial number 2,030,287 filed Nov. 19, 1990 entitled "Injection Molding Apparatus having Separate Heating Element in the Cavity Forming Insert".

While the above coinjection systems show each melt passage having only a single channel, the applicant's German patent application serial numbers P40 32499.0 entitled "A Method of Producing a Multi-Component Injection Moulded Part and a Multi-Cavity Injection Moulding System", P40 32500.8 entitled "A Method of Producing a Multi-Component Injection Moulded Part and a Multi-Cavity Injection Moulding System", P40 32508.3 entitled "An Injection Nozzle" and P40 32509.1 entitled "An Injection Nozzle for an Injection Moulding System and a Method of Producing the Same", all filed Oct. 12, 1990 show valve gated coinjection molding systems having an outer passage which extends through a pair of spaced channels in each nozzle. In order to thermal gate larger volumes of materials, it is preferable to have a heated cavity forming insert separate from each nozzle, and that each outer melt passage have more than two channels. However, it is also necessary to maintain balanced melt flow, avoid dead spots and minimize shear stress.

SUMMARY OF THE INVENTION

Accordingly, it is an object of the present invention to at least partially overcome the disadvantages of the prior art by providing thermal gated coinjection molding apparatus having melt distribution plates to allow the outer melt passage to have four radially spaced channels extending through each nozzle to a gate in a separate heated cavity forming insert.

To this end, in one of its aspects, the invention provides an injection molding thermal gated apparatus to coinject pressurized melt received from first and second melt sources to a plurality of cavities, comprising a heated nozzle having a rear face mounted between a common manifold having a forward face and an adjacent heated cavity forming insert the adjacent cavity forming insert having a central gate leading to one of the cavities, a first melt passage from the first melt source branching in the manifold to extend through a central melt bore in each nozzle and an adjacent cavity forming insert to the gate in the adjacent cavity forming insert, a second melt passage from the second melt source branching in the manifold to extend through four melt channels in each nozzle and a melt funnel duct in the adjacent cavity forming insert, the four melt channels in each nozzle extending parallel to and radially spaced around the central melt bore, the melt funnel duct in the adjacent cavity forming insert extending around the central melt bore and tapering inwardly to join the central melt bore adjacent the gate, a melt distribution plate mounted between each nozzle and the common manifold, the distribution plate having a rear face which abuts against the forward face of the manifold and a forward face which abuts against the rear face of the nozzle, the melt distribution plate having a central bore extending therethrough from the first melt passage in the manifold to the central melt bore in the nozzle, the melt distribution plate having two holes spaced around the central bore which extend therethrough from the rear face to the forward face, the rear face of the distribution plate and the forward face of the manifold having matching curved grooves which form a melt conduit which branches from the second melt passage in the manifold to the two spaced holes extending through the distribution plate, the forward face of the distribution plate and the rear face of the nozzle each having two curved matching grooves which form two melt conduits, each of which melt conduits branches from one of the holes through the distribution plate to two of the melt channels in the nozzle.

Further objects and advantages will appear from the following description taken together with the accompanying drawings.

BRIEF DESCRIPTION OF THE DRAWINGS

FIG. 6 is a sectional view of coinjection molding apparatus having three melt passages from three different melt sources.

DETAILED DESCRIPTION OF THE PREFERRED EMBODIMENTS

Figure 1:
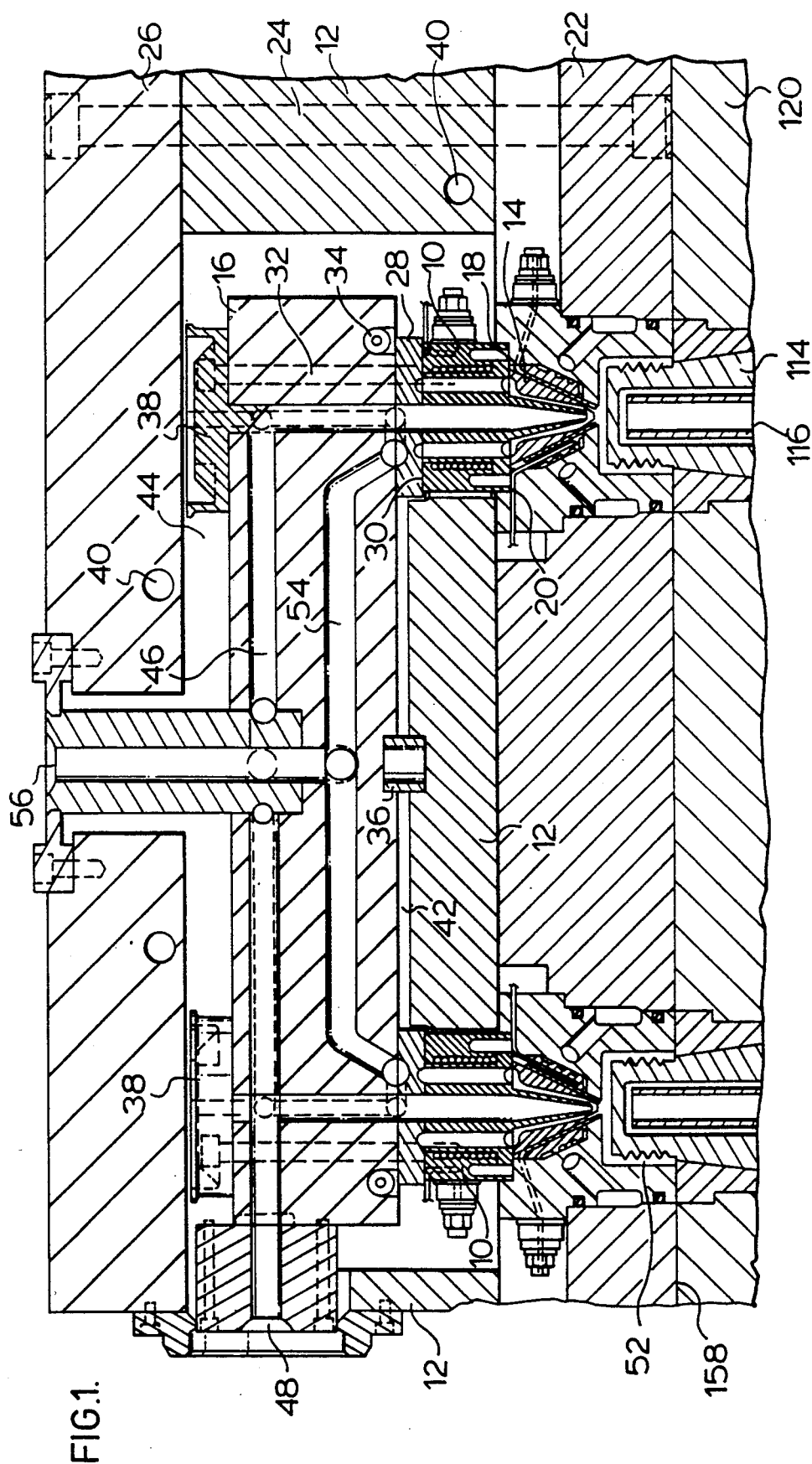
FIG. 1 is a sectional view of a portion of a thermal gated multi-cavity coinjection molding system or apparatus having melt distribution plates according to a first embodiment of the invention.
Figure 2:
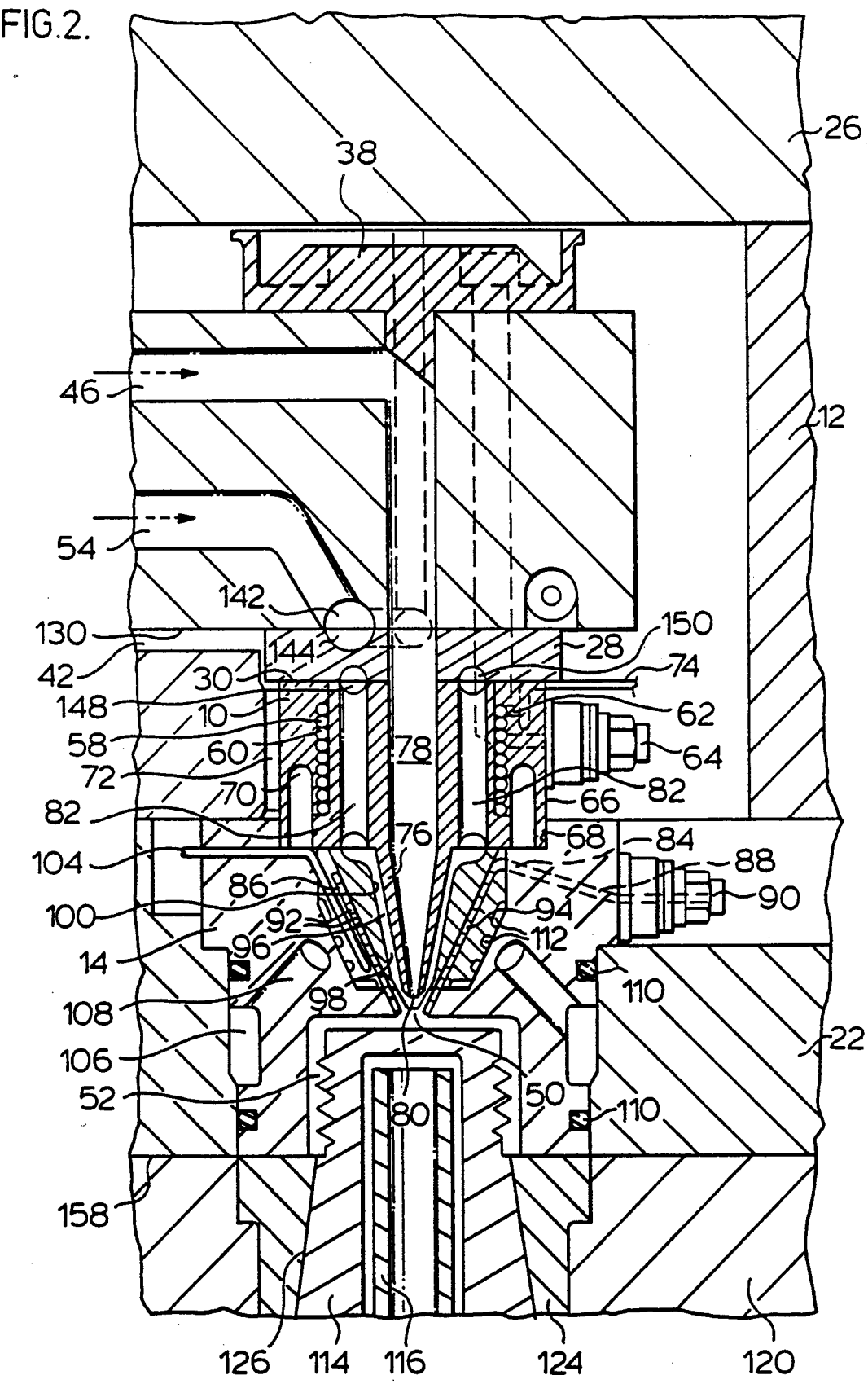
FIG. 2 is an enlarged sectional view of one of the nozzles and the adjacent cavity forming insert seen in FIG. 1.

Reference is first made to FIGS. 1 and 2 which shows a portion of a thermal gated multi-cavity coinjection molding system or apparatus having a number of heated nozzles 10, each of which is received in a manifold retainer plate 12 between a cavity forming insert 14 and a common elongated manifold 16. As seen in FIG. 1, the cavity insert 14 is secured in position with its rear end 18 abutting against the forward end 20 of the nozzle 10 by a cavity insert retainer plate 22. The cavity insert retainer plate 22 is held in place by bolts 24 which extend through the manifold retainer plate 12 to a backplate 26.

As described in more detail below, a melt distribution plate 28 is mounted between the manifold 16 and the rear face 30 of each nozzle 10 by bolts 32. The manifold 16 which is heated by an electric heating element 34 which is integrally cast into it as described in the applicant's U.S. Pat. No. 4,688,622 which issued Aug. 25, 1987. The manifold 16 is securely located in place between the manifold retainer plate 12 and the backplate 26 by a central locating ring 36 and a number of spacer rings 38. The manifold retainer plate 12 and the backplate 26 are cooled by pumping cooling water through cooling conduits 40. The locating ring 36 provides an insulative air space 42 between the heated manifold 16 and the cooled manifold retainer plate 12. The spacer rings 38 provide another insulative air space 44 between the heated manifold 16 and the cooled backplate 26.

In this embodiment, the manifold 16 has a first or inner melt passage 46 which receives melt from one cylinder of a molding machine (not shown) at a first inlet 48. The first melt passage 46 branches in the manifold 16 to extend centrally through each melt distribution plate 28, nozzle 10 and cavity forming insert 14 to a gate 50 leading to a cavity 52. The manifold 16 also has a second or outer melt passage 54 which receives melt from another cylinder of the molding machine at a second inlet 56. The second melt passage 54 also branches in the manifold 16 and extends through each melt distribution plate 28, nozzle 10 and cavity forming insert 14 to the gate 50, as described in more detail below.

As best seen in FIG. 2, each nozzle 10 is heated by an integral electrically insulated heating element 58 which has a helical portion 60 and a terminal portion 62 which extends outwardly to an external terminal 64. The heated nozzle 10 is located by an outer collar portion 66 being received in a matching circular seat 68 in the rear end 18 of the adjacent cavity forming insert 14. The collar portion 66 forms an air gap 70 extending around the helical portion 60 of the heating element 58 and another insulative air space 72 is provided around the nozzle 10 to reduce heat loss to the surrounding cooled manifold retainer plate 12. Each nozzle 10 has a thermocouple 74 which extends inwardly to monitor the operating temperature adjacent the helical portion 60 of the heating element 58.

The nozzle 10 has a hollow tapered nose portion 76 which extends forwardly centrally into the adjacent cavity forming insert 14. A central bore 78 extends through the nose portion 76 which tapers inwardly to a mouth 80 adjacent the gate 50 to the cavity 52. The central bore 78 forms part of the first or inner melt passage 46 which conveys pressurized melt to the gate 50. The nozzle 10 also has four melt channels 82 which are radially spaced around the central bore 78. These four melt channels 82 form part of the second or outer melt passage 54 and receive melt which flows through the melt distribution plate 28 as described in more detail below.

Figure 4:
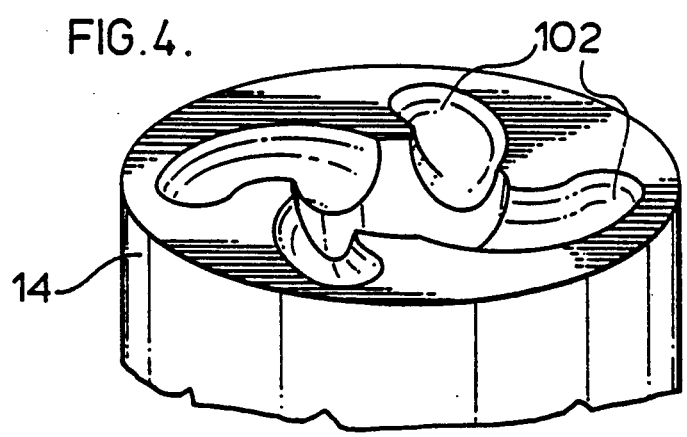
FIG. 4 is an isometric view showing the rear end of the adjacent cavity forming insert.

Each cavity forming insert 14 also has an integral electrically insulated heating element 84, as described in the applicant's Canadian patent application serial number 2,030,287 referred to above. The heating element 84 has a coiled inner portion 86 and an outer terminal portion 88 which extends to an external terminal 90. The outer terminal portion 88 has a generally uniform circular cross section, while the coiled inner portion 86 has a generally uniform rectangular cross section. As described in detail in the applicant's Canadian patent application serial number 2,030,286 filed Nov. 19, 1990 entitled "Injection Molding Nozzle having Tapered Heating Element Adjacent the Bore", the inner portion 86 is made by coiling a portion of a heating element and then compressing it in an opening in a tapered die. Thus, the adjacent coils 92 with the rectangular cross section form a tapered inner surface 94. The cavity forming insert 14 has a tapered central opening 96 which extends therethrough from the rear end 18 to the gate 50. The opening 96 receives the nose portion 76 of the adjacent nozzle 10, which forms a melt funnel duct 98 between the nose portion 76 of the nozzle 10 and the surrounding inner surface 100 of the opening 96. This melt funnel duct 98 forms part of the second or outer melt passage 54, and it extends around the nose portion 76 until it joins the first melt passage 46 adjacent the gate 50. In this area adjacent the gate, the inner surface 100 of the opening 96 is formed by the tapered inner surface 94 of the adjacent coils 92 of the heating element 84. As best seen in FIG. 4, the melt funnel duct 98 in the cavity forming insert 14 has four spiral inlets 102, each of which are aligned with one of the four spaced melt channels 82 in the adjacent nozzle 10. This imparts a swirling motion to the incoming pressurized melt which avoids dead spots in the melt funnel duct 98 and melt flow lines in the molding. The cavity forming insert 14 also has a thermocouple 104 to monitor the operating temperature adjacent the heating element 84. The cavity forming insert 14 is cooled by pumping cooling water through a cooling channel 106 which extends between it and the surrounding retainer plate 22.

The cooling channel 106 has a number of pie-shaped portions 108 which extend inwardly adjacent the inner portion 86 of the heating element 84. 0-rings 110 extend around between the cavity forming insert 14 and the surrounding cavity insert retainer plate 22 to prevent leakage of the cooling water. The cavity forming insert 14 has a number of circular air insulation rings 112 which provide a desired pattern of insulation between the inner portion 86 of the heating element 84 and the pie-shaped portions 108 of the cooling channel 106.

Each cavity 50 is formed of a desired shaped and size between the cavity forming insert 14 and an adjacent core insert 114. The core insert 114 is cooled by cooling water which flows through a central cooling tube 116. A stripper plate 120 secures a stripper ring 124 around a tapered portion 126 of the core insert 114.

Figure 3:
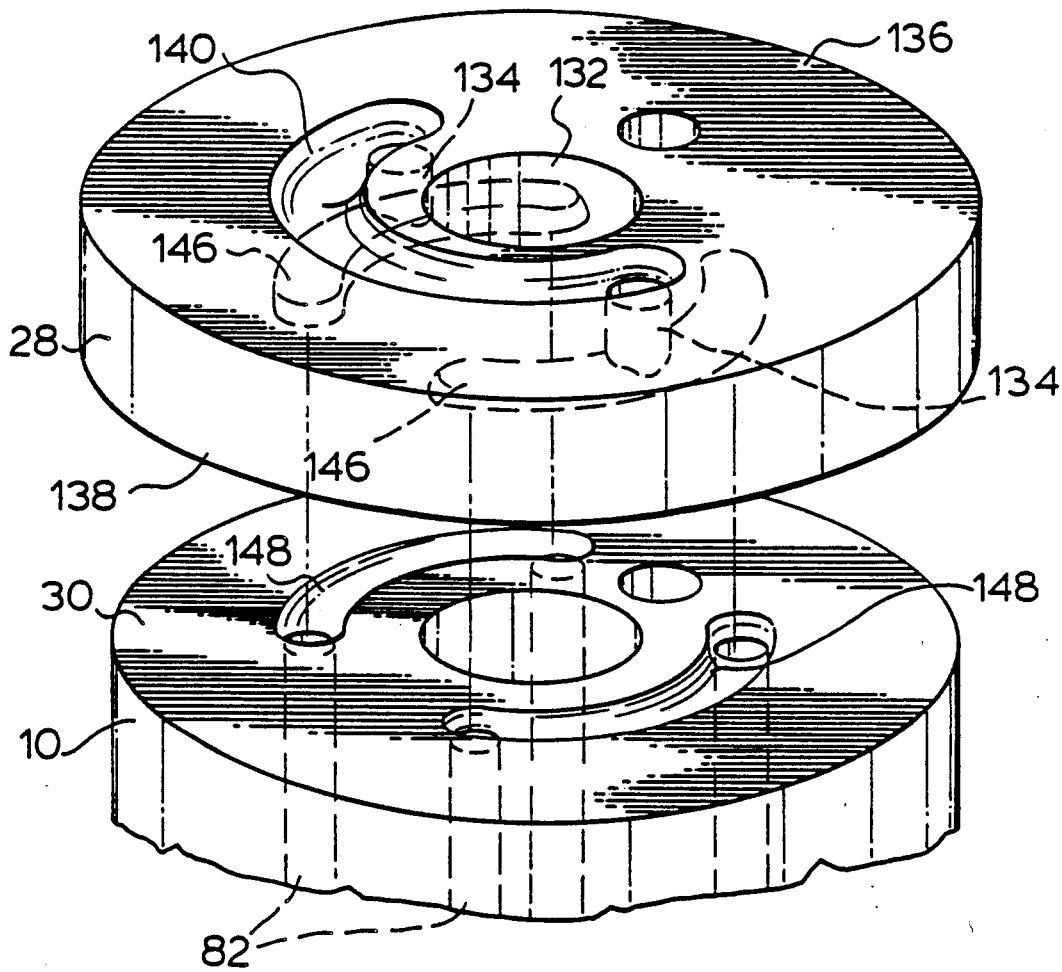
FIG. 3 is an exploded isometric view showing one of the melt distribution plates and the rear face of the adjacent nozzle.

The melt distribution plate 28 will now be described in more detail, with particular reference to FIGS. 2 and 3. Each melt distribution plate 28 is mounted between the forward face 130 of the manifold 16 and the rear face 30 of one of the nozzles 10. The melt distribution plate 28 has a central bore 132 which extends therethrough to form part of the first melt passage 46 in alignment with the central bore 78 through the nozzle 10. A pair of spaced holes 134 extend through the melt distribution plate 28 from its rear face 136 to its forward face 138. The rear face 136 of the distribution plate 28 and the forward face 130 of the manifold 16 have matching curved grooves 140,142 which form a curved melt conduit 144. This conduit branches from the second melt passage 54 in the manifold 16 to the two spaced holes 134 extending through the melt distribution plate 28. Similarly, the forward face 138 of the distribution plate 28 and the rear face 30 of the adjacent nozzle 10 each have two curved matching grooves 146,148 which form two curved melt conduits 150. Each of these conduits 150 branch out from one of the spaced holes 134 through the distribution plate 28 to two of the four melt channels 82 which extend through the nozzle 10. Thus, the second or outer melt passage 54 is split into four parts to evenly distribute the melt around the gate 50. The grooves 140,142, 146,148 and the spaced holes 134 are all made with no sharp corners to minimize shear stress of the melt flowing through them.

Figure 5:
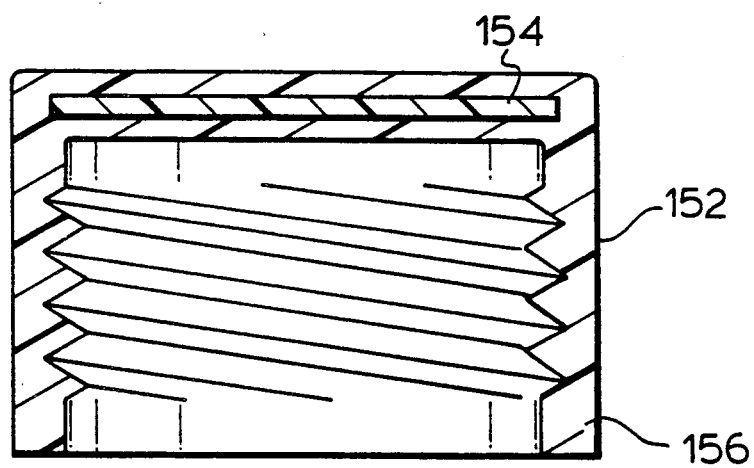
FIG. 5 is a typical product molded by the apparatus seen in FIGS. 1–4.

In use, the system is assembled as shown in FIG. 1 and electrical power is applied to the heating element 34 of the manifold 16, the heating elements 58 of the nozzles 10, and the heating elements 84 of the cavity forming inserts 14 to heat them to a predetermined operating temperature. Pressurized melt is injected from the molding machine (not shown) through the inlets 48,56 into the first and second melt passages 46,54 in the manifold 16 according to a predetermined operating cycle. In order to provide thermal or temperature assisted gating, the power to the heating elements 84 of the cavity forming inserts 14 is controlled in conjunction with the melt injection pressure. The pressurized melt is coinjected through the melt passages 46,54 which extend through each melt distribution plate 28, each nozzle 10 and each cavity forming insert 14 to the gates 50, and fills the cavities 52. FIG. 5 shows a typical molded container cap 152 which is coinjected using this apparatus. As can be seen, the cap has an inner barrier material 154 such as nylon and an outer material 156 such as polypropylene. The inner material 154 is injected through the first or inner melt passage 46, while the outer material 156 is coinjected around it through the second or outer melt passage 54. The fact that the second melt passage 54 splits into the four melt channels 82 through each nozzle 10 and then extends through the tapered melt funnel duct 98 of each cavity forming insert 14 ensures that the outer material 156 is evenly distributed around the inner material 154.

After the cavities 50 are filled, the injection pressure is held momentarily to pack and then released. Following a short cooling period, the mold is opened along the parting line 158 to eject the molded products. The power to the heating elements 84 is switched off just after termination of the holding pressure. The heat in the gate and cavity areas is quickly dissipated by the water flowing through the cooling channels 106 and the gates 50 freeze off to provide a clean break. Power is reapplied to the heating elements 84 just after the mold opening stroke is initiated. This rapidly heats the solidified melt in the gates 50 so they open immediately when melt injection pressure is reapplied after the mold is closed. This cycle is repeated continuously as rapidly as the molded part allows.

Reference is now made to FIG. 6 to describe a second embodiment of the invention. As many of the elements in this embodiment are similar to those of the first embodiment, elements common to both embodiments are described and illustrated using the same reference numerals. As can be seen, in this embodiment the structure of the nozzles 10 and cavity forming inserts 14 remain the same as described above, except that a fixed pin 160 extends centrally through a portion of the first melt passage 46 into each central bore 78. The pin 160 has a head 162 which is fixed by cap 164 in the spacer ring 38 and a pointed tip end 166 which extends adjacent the mouth 80 of the tapered nose portion 76 of the nozzles 10. In this embodiment, there are two manifolds 168,170 and a third melt passage 172 which receives melt from a third injection cylinder of the molding machine to coinject three different melts. This apparatus can be used, for instance, to apply a thin layer of glue melt between the inner and outer materials 154,156 seen in FIG. 5.

The first melt passage 46 extends through the rear manifold 168 and the second melt passage 54 extends through the forward manifold 170. Except for being in different manifolds and the fixed pin 160 these are essentially the same as described above and the description need not be repeated. However, the third melt passage 172 branches in the rear manifold 168 between the first and second melt passages 46,54 to melt bushings 174 which are seated in an air space 176 between the two manifolds 168,170. As can be seen, each melt bushing 174 has a central bore 178 through which the first melt passage 46 and the fixed pin 160 extend. The third melt passage 172 lead to a circular melt conduit 180 which is formed by matching grooves 182,184 in the rear face 186 of the melt bushing 174 and the abutting forward face 188 of the rear manifold 168. A very thin circular opening 190 extends between the central bore 178 and the surrounding circular melt conduit 180 through which a thin layer of melt is forced from the third melt passage 172 around the melt flowing through the first melt passage 46. As can be seen, the central bore 178 through the melt bushing 174 is slightly tapered to be a little larger in diameter at the rear face 186 than the diameter of the first melt passage 46 in the rear manifold 168. This helps to draw the melt in from the third melt passage 172. Of course, the melt from the first and third melt passages then flows along around the fixed pin 160 until it joins the melt from the second melt passage 54 adjacent the gate 50. Otherwise, the description of this embodiment is the same as that given above for the first embodiment and need not be repeated.

While the description of the coinjection molding apparatus having a melt distribution plate has been given with respect to preferred embodiments it is not to be construed in a limiting sense. Variations will occur to those skilled in the art. For instance, the apparatus can have various manifold configurations depending on the shape and number of cavities. The nozzles 10 and cavity forming inserts 14 can have different heating and cooling configurations. Reference is made to the appended claims for a definition of the invention.

The embodiments of the invention in which an exclusive property or privilege is claimed are defined as follows:

1. Injection molding thermal gated apparatus to coinject pressurized melt received from first and second melt sources to a plurality of cavities, said apparatus comprising a plurality of heated nozzles, each nozzle being in association with a corresponding one of said plurality of cavities, each heated nozzle being mounted between a forward face of a common manifold and an adjacent heated cavity forming insert, each adjacent cavity forming insert having a central gate leading to one of the cavities, a first melt passage connected to first melt source, said first melt passage branching in the manifold to extend through a central melt bore in each nozzle and the adjacent cavity forming insert to the gate in the adjacent cavity forming insert, a second melt passage connected to the second melt source, said second melt passage branching in the manifold to extend through four melt channels in each nozzle and a melt funnel duct in the adjacent cavity forming insert, the four melt channels in each nozzle extending parallel to and radially spaced around the central melt bore, the melt funnel duct in the adjacent cavity forming insert extending around the central melt bore and tapering inwardly to join the central melt bore adjacent the gate, a melt distribution plate mounted between each nozzle and the common manifold, the distribution plate having a rear face which abuts against the forward face of the manifold and a forward face which abuts against a rear face of the nozzle, the melt distribution plate having a central bore extending therethrough from the first melt passage in the manifold to the central melt bore in the nozzle, the melt distribution plate having two holes spaced around the central bore which extend therethrough from the rear face to the forward face, the rear face of the distribution plate and the forward face of the manifold having matching curved grooves which form a melt conduit which branches from the second melt passage in the manifold to the two spaced holes extending through the distribution plate, the forward face of the distribution plate and the rear face of the nozzles each having two curved matching grooves which form two melt conduits, each of said melt conduits branching from one of the holes through the distribution plate to two of the melt channels in each nozzle.

2. Injection molding apparatus as claimed in claim 1 wherein each nozzle has a hollow tapered nose portion which extends forwardly centrally into the adjacent cavity forming insert, the nose portion having a mouth adjacent the gate in the cavity forming insert, the central melt bore extending through the hollow nose portion and the melt funnel duct extending around the nose portion whereby the first and second melt passages join adjacent the gate.

3. Injection molding apparatus as claimed in claim 2 wherein the melt funnel duct in each cavity forming insert has four spiral inlets, each of said inlets being aligned with one of the four spaced melt channels in the adjacent nozzle to impart a swirling motion to the melt flowing therethrough.

4. Injection molding apparatus as claimed in claim 3 wherein the first melt passage extends in a rear manifold, the second melt passage extends in a forward manifold, a fixed pin is mounted to extend centrally through a portion of the first melt passage in the rear manifold and into the central bore of each nozzle, each fixed pin having a tapered tip end which extends adjacent the mouth of the nose portion of the nozzle, melt bushings having a central bore are mounted in an air space between the rear and forward manifolds, the central bore of each melt bushing having the first melt passage extending therethrough around one of the fixed pins, and a third melt passage branches in the rear manifold to extend to a circular melt conduit formed by matching grooves in one face of each melt bushing and an adjacent face of one of said forward and rear manifolds, a thin circular opening extending from the central bore of bushing to the surrounding circular melt conduit, wherethrough a thin layer of melt from the third melt passage is drawn around melt flowing through the central bore of each melt bushing from the first melt passage.

* * * * *